United States Patent
McNeal et al.

(10) Patent No.: US 11,871,693 B1
(45) Date of Patent: Jan. 16, 2024

(54) TRANSPLANTER

(71) Applicant: Neversink Tools, Cookeville, TN (US)

(72) Inventors: Carson McNeal, Doyle, TN (US); Conor Crickmore, Claryville, NY (US)

(73) Assignee: Neversink Tools, Cookeville, TN (US)

( * ) Notice: Subject to any disclaimer, the term of this patent is extended or adjusted under 35 U.S.C. 154(b) by 0 days.

(21) Appl. No.: 18/213,794

(22) Filed: Jun. 23, 2023

Related U.S. Application Data

(60) Provisional application No. 63/414,024, filed on Oct. 7, 2022.

(51) Int. Cl.
*A01C 11/02* (2006.01)
*A01C 11/00* (2006.01)

(52) U.S. Cl.
CPC ............ *A01C 11/02* (2013.01); *A01C 11/006* (2013.01)

(58) Field of Classification Search
CPC ....... A01C 11/02; A01C 11/025; A01C 11/00; A01C 11/006; A01C 7/02
See application file for complete search history.

(56) References Cited

U.S. PATENT DOCUMENTS

| | | | | |
|---|---|---|---|---|
| 60,620 A | * | 12/1866 | Cortes | A01C 11/02 111/71 |
| 117,622 A | * | 8/1871 | Griffith | A01C 11/02 111/111 |
| 885,091 A | * | 4/1908 | Sinclair | A01C 11/025 111/107 |
| 1,215,125 A | * | 2/1917 | Davis | A01C 11/02 111/107 |
| 3,643,611 A | * | 2/1972 | Owens | A01C 11/02 172/166 |
| 4,132,337 A | * | 1/1979 | Masuda | A01G 9/0295 206/820 |
| 4,231,186 A | * | 11/1980 | Ruuska | A01G 9/0295 493/110 |
| 4,305,337 A | * | 12/1981 | Centofanti | A01C 11/02 111/107 |
| 4,341,333 A | * | 7/1982 | Boa | A01C 11/02 225/101 |
| 4,404,917 A | * | 9/1983 | Hakli | A01C 11/02 111/109 |

(Continued)

FOREIGN PATENT DOCUMENTS

JP 2563432 Y2 * 11/1993

OTHER PUBLICATIONS

Johnnyseeds, The Paperpot Transplanter: An Introductory Demonstration, Apr. 23, 2018, https://www.youtube.com/watch?v=IhiidcOYgPU (Year: 2018).*

(Continued)

*Primary Examiner* — Jamie L McGowan
(74) *Attorney, Agent, or Firm* — LaBatt, LLC

(57) ABSTRACT

A transplanter including a frame structure that is configured to support a tray, an operating handle structure, and a base structure including a chute. The frame structure can include a furrower to from a furrow in soil and the transplanter can also include a furrow closing structure configured to close the furrow at a location beyond an end of the chute. The operating handle structure can enable one or more attributes of the operating handle to be selectively reconfigured. The base structure can be fabricated from one or more injection molded parts.

21 Claims, 16 Drawing Sheets

(56) References Cited

U.S. PATENT DOCUMENTS

| | | | | | |
|---|---|---|---|---|---|
| 4,597,343 | A | * | 7/1986 | Nambu | A01C 11/02 |
| | | | | | 111/105 |
| 4,829,915 | A | * | 5/1989 | Ahm | A01C 7/048 |
| | | | | | 405/176 |
| 4,970,972 | A | * | 11/1990 | Williames | A01C 11/025 |
| | | | | | 111/111 |
| 5,415,115 | A | * | 5/1995 | Masuda | A01C 11/02 |
| | | | | | 111/105 |
| 5,996,513 | A | * | 12/1999 | Nanbu | A01C 11/02 |
| | | | | | 111/105 |
| 6,305,303 | B1 | * | 10/2001 | Wright | A01C 7/048 |
| | | | | | 111/114 |
| 6,321,667 | B1 | * | 11/2001 | Shoup | A01C 5/068 |
| | | | | | 111/164 |
| 10,772,271 | B2 | * | 9/2020 | Storey | A01C 11/02 |
| 2009/0212517 | A1 | * | 8/2009 | Stark | B62B 1/22 |
| | | | | | 298/7 |
| 2017/0303464 | A1 | * | 10/2017 | Sivinski | A01C 5/064 |

OTHER PUBLICATIONS

Paperpot Transplanter, printed from https://www.johnnyseeds.com/tools-supplies/transplanters/paperpot-transplanter-7601.html?cgid=new-for-2017%21-tools-and-supplies on Jul. 5, 2023 (product available prior to Oct. 7, 2022), 4 pages.

Pullcat HP16, printed from https://www.activevista.com.au/product/pullcat-hp16-paperpot-transplanter/ on Jul. 5, 2023 (product available prior to Oct. 7, 2022) 12 pages.

Plant More Combo, printed from https://curlysag.com/plant-more-combo/ on Jul. 5, 2023 (product available prior to Oct. 7, 2022), 5 pages.

Paperpot Transplanter Paper Chain Pots Comparison Chart, Johnny's Selected Seeds, Nov. 1, 2021, 1 page.

Neversink Farm, Facebook post of Jul. 15, 2022. 4 pages.

* cited by examiner

TRANSPLANTER

REFERENCE TO RELATED APPLICATIONS

The current application claims the benefit of U.S. Provisional Application Ser. No. 63/414,024, which was filed on 7 Oct. 2022, and which is hereby incorporated by reference.

TECHNICAL FIELD

The disclosure relates generally to a transplanter, and more particularly, to a transplanter for planting a chain of paper pots with seedlings in a field.

BACKGROUND ART

Transplanters are a commonly used farming instrument for transplanting seedlings to a field. One type of transplanter is particularly configured for planting seedlings that have been grown in individual pots of a chain of paper pots.

A typical transplanter for a chain of paper pots includes an area for holding the pots and a chute along which the pots can slide as the transplanter is moved along a row of soil. On a bottom side of the transplanter, a furrower makes a furrow in the soil as the transplanter is moved along the soil. As the paper pots move off the chute, they fall into the furrow. The transplanter can include sweeps located beyond the end of the chute which move the soil over the paper pots. To date, such transplanters are fabricated from sheet metal.

SUMMARY OF THE INVENTION

Aspects of the invention provide a transplanter which addresses one or more issues of current transplanters. Embodiments of the transplanter include a frame structure that is configured to support a tray, an operating handle structure, and a base structure including a chute. The frame structure can include a furrower to from a furrow in soil and the transplanter also can include a furrow closing structure configured to close the furrow at a location beyond an end of the chute. Embodiments of the operating handle structure can enable one or more attributes of the operating handle to be selectively reconfigured. Embodiments of the base structure can be fabricated from one or more injection molded parts.

A first aspect of the invention provides a transplanter comprising: a guide wheel structure including a set of guide wheels; a frame structure including a set of frames configured for supporting a tray; an operating handle structure connected to the guide wheel structure and the frame structure, the operating handle structure including a grip for operating the transplanter; and a base structure connected to the frame structure, the base structure including a chute, wherein the base structure is fabricated from at least one injection molded part.

A second aspect of the invention provides a transplanter comprising: a guide wheel structure including a set of guide wheels; a frame structure including: a set of frames configured for supporting a tray; and a furrower configured to form a furrow in soil; an operating handle structure connected to the guide wheel structure and the frame structure, wherein the operating handle structure includes: a fixed extension attached to the frame structure and the guide wheel structure; an adjustable extension configured to be attached to the fixed extension, wherein an angle between the fixed extension and the adjustable extension is selectively adjustable; and a grip for operating the transplanter, wherein the grip is attached to an end of the adjustable extension; a base structure including a funnel-like shaped back portion and a chute extending from the funnel-like shaped back portion; and a furrow closing structure configured for closing the furrow, wherein the furrow closing structure is mounted to the base structure at a location beyond an end of the chute.

A third aspect of the invention provides a transplanter comprising: a guide wheel structure including a set of guide wheels; a frame structure including: a set of frames configured for supporting a tray; and a furrower configured to form a furrow in soil; an operating handle structure connected to the guide wheel structure and the frame structure, wherein the operating handle structure includes: a fixed extension attached to the frame structure and the guide wheel structure; an adjustable extension configured to be attached to the fixed extension, wherein an angle between the fixed extension and the adjustable extension is selectively adjustable; and a grip for operating the transplanter, wherein the grip is attached to an end of the adjustable extension; a base structure including a chute, wherein the base structure is fabricated from at least one injection molded part; and a furrow closing structure configured for closing the furrow, wherein the furrow closing structure is mounted to the base structure at a location beyond an end of the chute.

Embodiments of the base structure can include two or more injection molded parts. For example, a first injection molded part can form a back portion of the base structure and have a funnel-like shape, and a second injection molded part can form a front portion of the base structure and include the chute. Embodiments of the base structure can include one or more features to assist in aligning other components of the transplanter and/or components used therewith. For example, back end of the base structure can be configured to assist in securing and/or placing a tray with transplants in place. A front end of the base structure can include one or more structures that secure and properly align components of the furrow closing structure.

Embodiments of the guide wheel structure can include a pair of guide wheels. Embodiments of the furrow closing structure can include a pair of angled closing plows and/or a pair of angled closing wheels. Embodiments of each of the guide wheel structure and the furrow closing structure can enable a spacing between the respective components, such as the guide wheels, closing plows, and/or closing wheels, to be selectively adjusted. The spacing can be narrowed or widened to accommodate use of the transplanter to plant transplants with different sizes and/or with different spacing between adjacent rows.

Embodiments of the operating handle structure can include two extensions with an adjustable length and/or angle there between. Embodiments can include a connector piece which is configured to enable the selective attachment of the two extensions with at least two different angles and/or with a plurality of lengths. In an embodiment, at least one of the selectable angles is configured to enable a grip and extension to support the transplanter in an upright orientation on a level surface.

Further aspects of the invention provide methods of planting transplants using the transplanter.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 2A and 2B show illustrative alternative handle configurations according to an embodiment, while

FIG. 4A shows alternative narrow and standard wheel configurations for the guide wheels according to an embodiment, while

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Aspects of the invention are directed to a transplanter with one or more features that address one or more shortcomings in existing transplanters. Embodiments of the transplanter include a frame structure that is configured to support a tray, an operating handle structure, and a base structure including a chute. The frame structure can include a furrower to from a furrow in soil and the transplanter also can include a furrow closing structure configured to close the furrow at a location beyond an end of the chute. Embodiments of the operating handle structure can enable one or more attributes of the operating handle to be selectively reconfigured. Embodiments of the base structure can be fabricated from one or more injection molded parts.

Figure 1:
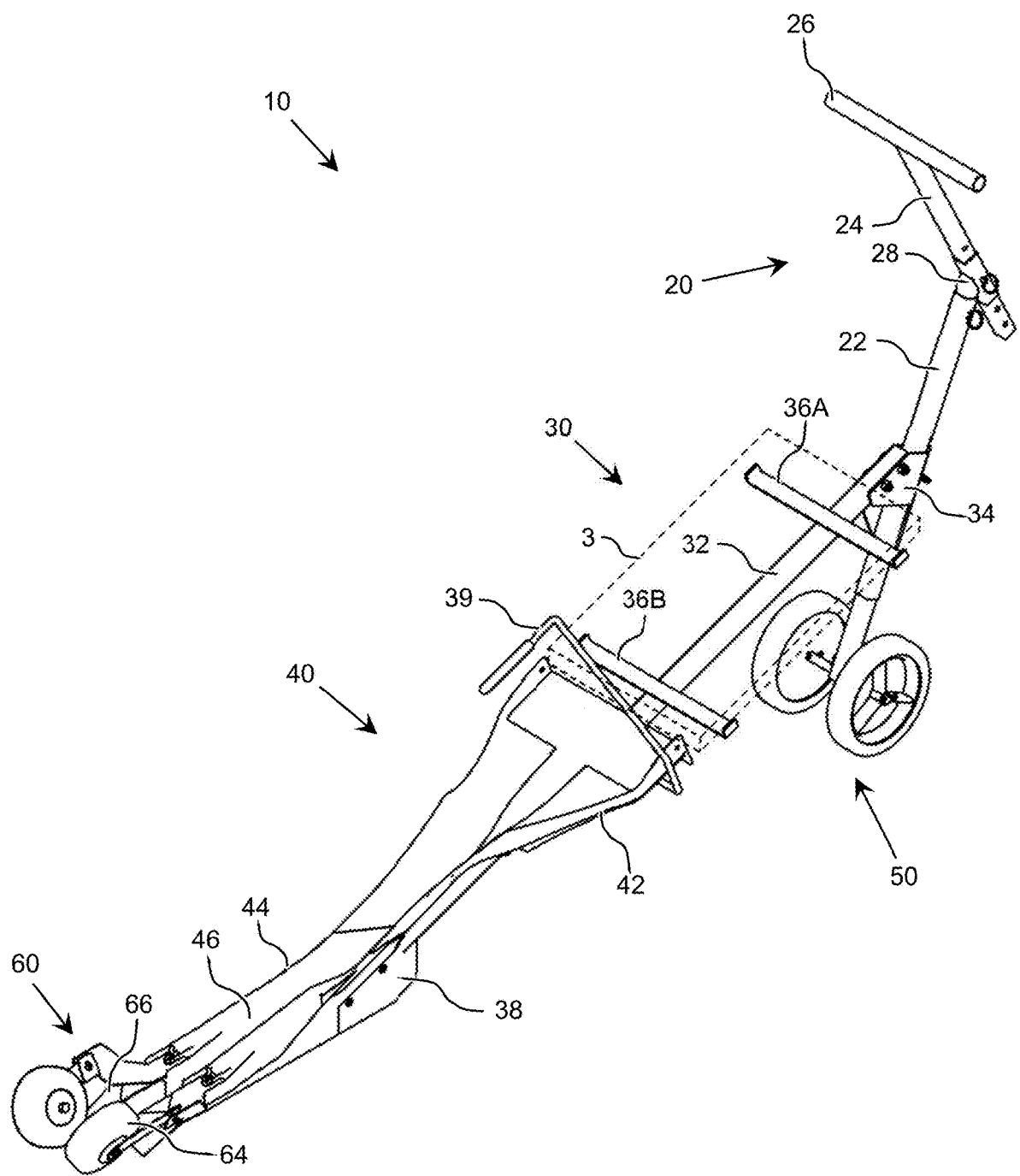
FIG. 1 shows an illustrative transplanter according to an embodiment.

Turning to the drawings, FIG. 1 shows an illustrative transplanter 10 according to an embodiment. As illustrated, the transplanter 10 includes an operating handle structure 20, a frame structure 30, a base structure 40, a guide wheels structure 50, and a furrow closing structure 60. Illustrative features of an embodiment of each of these structures will be further described in conjunction with the various figures shown herein.

Figure 2A:
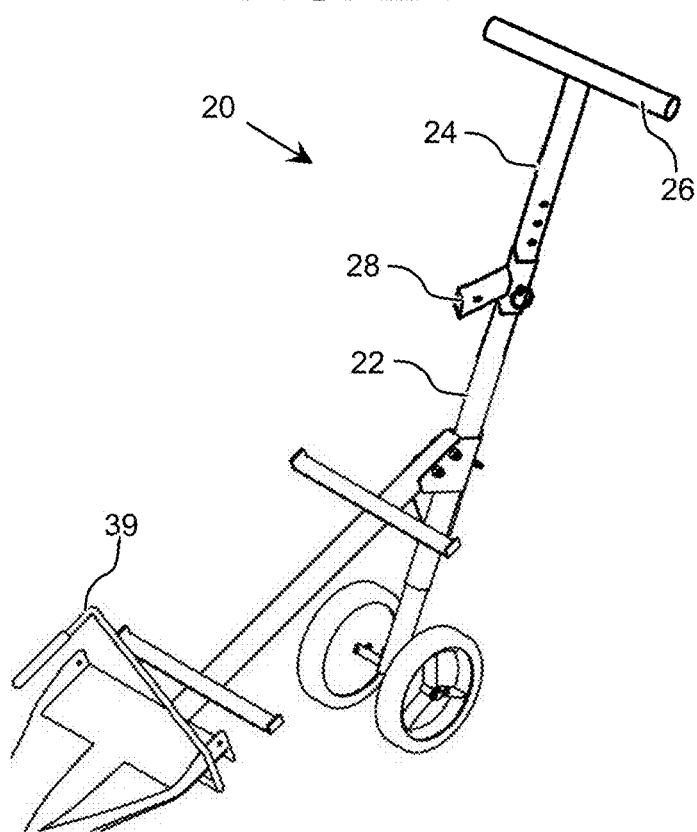
Figure 2B:
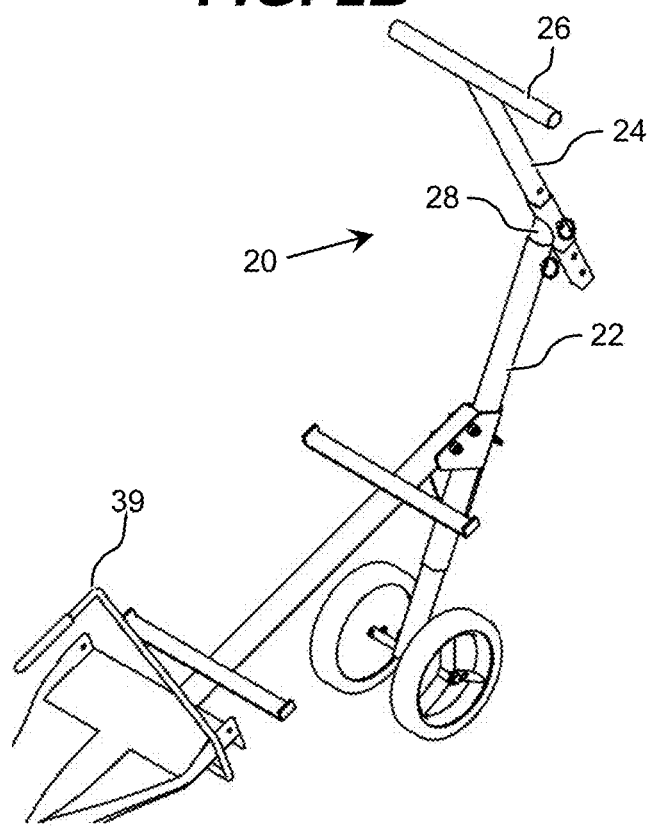

An embodiment of the operating handle structure 20 can include one or more reconfigurable features. For example, the operating handle structure 20 is shown including a fixed extension 22 and an adjustable extension 24. As illustrated in FIGS. 2A and 2B, the adjustable extension 24 can be attached to the fixed extension 22 in one of at least two alternative handle configurations. In particular, in a first configuration shown in FIG. 2A, the fixed extension 22 can be attached at a first angle in which the adjustable extension 24 extends substantially straight from the fixed extension 22. In a second configuration shown in FIGS. 1 and 2B, the fixed extension 22 can be attached at a second angle in which the adjustable extension 24 extends at a bent angle between ninety and one hundred eighty degrees from the fixed extension 22.

As illustrated, the operating handle structure 20 can include a connector piece 28, which enables the selective configuration of the adjustable extension 24 in each of the two configurations. In particular, to enable the first configuration shown in FIG. 2A, the connector piece 28 can include two aligned ends, each of which is configured to enable connection with an end of a corresponding extension 22, 24 using, for example, a male/female connection. For example, as illustrated, each end of the connector piece 28 can have an opening sized to allow insertion of an end of each extension 22, 24 therein. Each extension 22, 24 can be secured to the connector piece 28 using, for example, a pin inserted into corresponding openings located on side surfaces of both the connector piece 28 and each extension 22, 24.

To enable the second configuration shown in FIG. 2A, the connector piece 28 can further include an angled end. The angled end can be secured at a fixed angle with respect to the two aligned ends using any solution (e.g., welding). The fixed angle can be selected to provide a desired angle between the extensions 22, 24. As illustrated in FIG. 2B, the angled end can be sized to be inserted into an end of the fixed extension 22 and secured thereto using, for example, a pin inserted into openings located on side surfaces of both the angled end and the fixed extension 22. The adjustable extension 24 can be inserted into the aligned ends of the connector piece 28. As illustrated, the aligned ends can be configured to allow the adjustable extension 24 to be inserted entirely there through. Furthermore, the adjustable extension 24 can include a plurality of openings along a side surface that enable the selection of any of several distances between the connector piece 28 and the grip 26 at which the adjustable extension 24 can be secured to the connector piece 28 (e.g., using a pin inserted therein).

The bent angle configuration for the adjustable extension 24 shown in FIGS. 1 and 2B can provide several benefits. For example, while planting along a row, the operator can be closer to the location at which the paper pots are entering the ground, thereby having a better view of the planting process. Additionally, an overall length of the transplanter 10 is shortened, allowing it to be used closer to structures or other plantings, which can prevent operation of the transplanter 10 all the way to an end of a row of plantings.

Figure 2C:
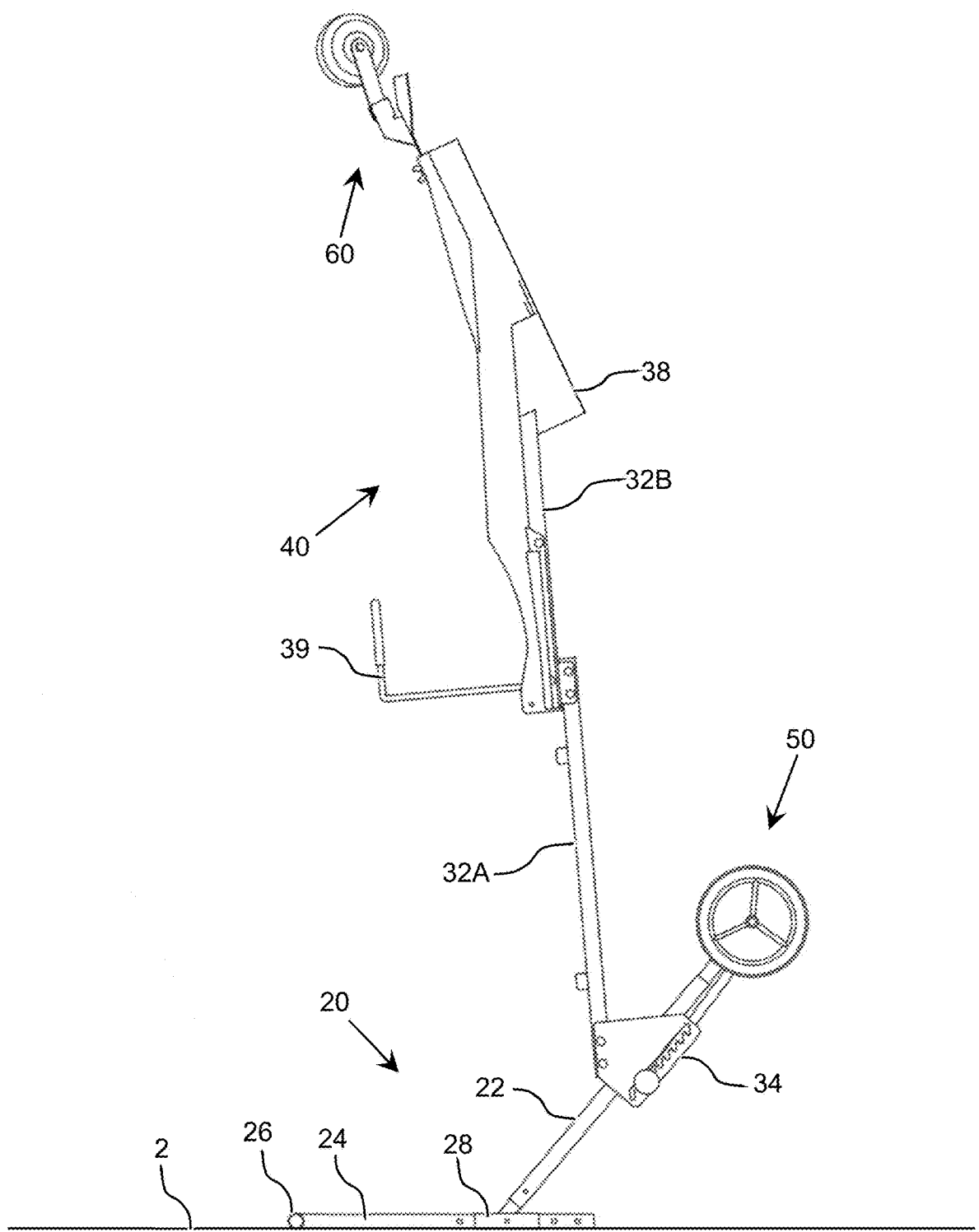
FIG. 2C shows an illustrative transplanter stored using the bent handle configuration of FIG. 2B according to an embodiment.

The shortened overall length also occupies less storage space. Additionally, as shown in FIG. 2C, an embodiment of the transplanter 10 has an angle for the adjustable extension 24 selected such that the transplanter 10 can be stored in an upright manner with the adjustable extension 24 and grip 26 providing a base that supports the transplanter 10 on a surface 2. To this extent, the transplanter 10 can be sufficiently balanced in each direction to enable the adjustable extension 24 and grip 26 to provide a suitable stand for independently supporting the transplanter 10 on a substantially level surface 2.

While the handle structure 20 is shown enabling an adjustable angle between a fixed extension 22 and an adjustable extension 24, it is understood that this is only an illustrative configuration. For example, embodiments of the handle structure 20 can include no adjustable attributes, additional adjustable attributes, or alternative adjustable attributes. To this extent, embodiments of a handle structure 20 can include a fixed extension 22 and/or adjustable extension 24 having an adjustable length (e.g., telescoping structures with holes for inserting a pin). Additionally, an embodiment of the grip 26 can be selectively located in a center of the adjustable extension 24 or moved to one side or the other of the adjustable extension 24.

It is understood that the use of a connector piece 28 and pins as illustrated and described herein to enable an adjustable angle between a fixed extension 22 and an adjustable extension 24 is only illustrative of various solutions that can be used to implement a handle structure 20 having an adjustable extension 24 that can be secured in two or more angles with respect to a fixed extension 22. For example, a connector piece 28 can include two ends, each of which can be temporarily or permanently attached to a corresponding end of an extension 22, 24, that can be selectively pivoted with respect to each other and secured at two or more desired angles with respect to each other (e.g., using a plurality of toothed structures, by tightening a joint, etc.).

The handle structure 20 can be attached to a rear end of a longitudinal support structure 32 of the frame structure 30 using an interface plate 34 mounted to the rear end of the longitudinal support structure 32 (e.g., using a pair of bolts and nuts). Furthermore, the fixed extension 22 can be connected to a guide wheels structure 50. In an embodiment, various components of the handle structure 20, frame structure 30, and guide wheels structure 50 are fabricated using powder coated steel. For example, various components can be fabricated from steel tubing or sheet metal. However, it is understood that one or more components can be fabricated from any suitable material, such as aluminum, fiberglass, a composite material, and/or the like.

Figure 3:
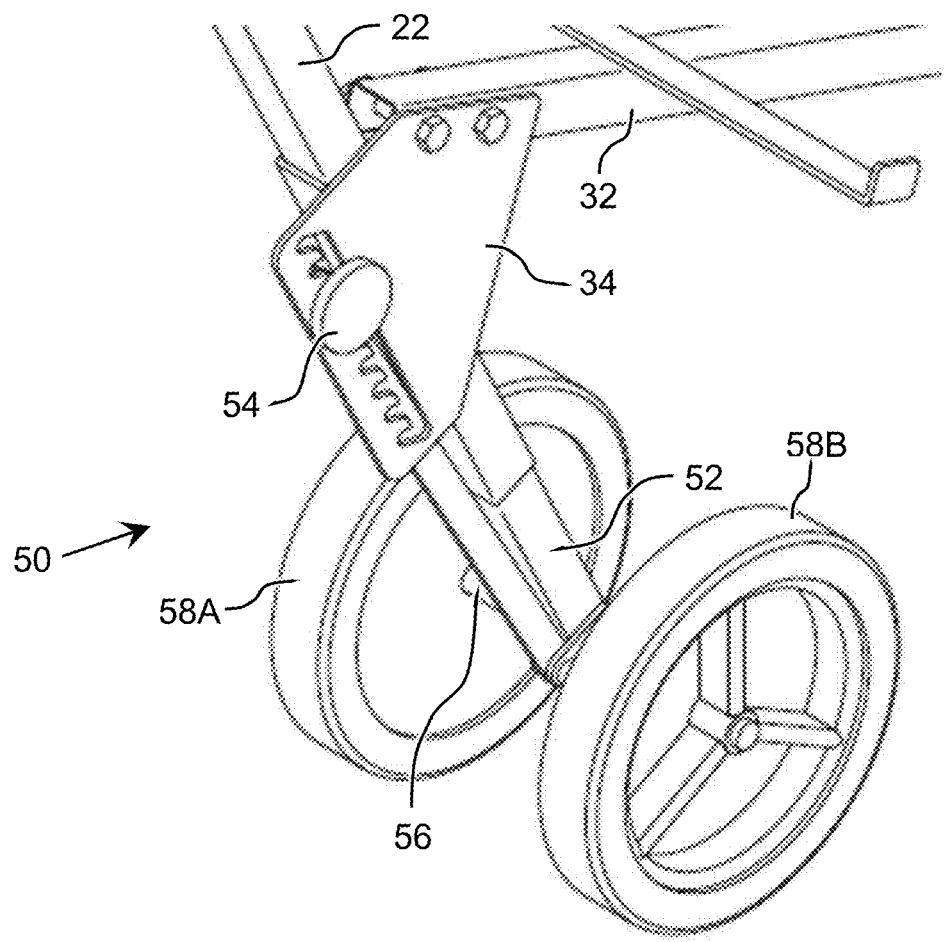
FIG. 3 shows a detail view of an illustrative configuration for adjusting a height of guide wheels of a transplanter according to an embodiment.

FIG. 3 shows a detail view of an illustrative guide wheel structure 50 and interface plate 34 configuration of a transplanter which enables a user to adjust a height by which the fixed extension 22 extends above a height of the guide wheels 58A, 58B according to an embodiment. In this case, the guide wheels 58A, 58B are mounted to a guide wheel axle 56, which extends through an end of the guide wheel extension 52. A length of the guide wheel extension 52 that extends below the interface plate 34 can be selectively adjusted using the guide wheel adjustment handle 54 to selectively lock the guide wheel extension 52 into one of a plurality of slots in the interface plate 34.

Figure 4A:
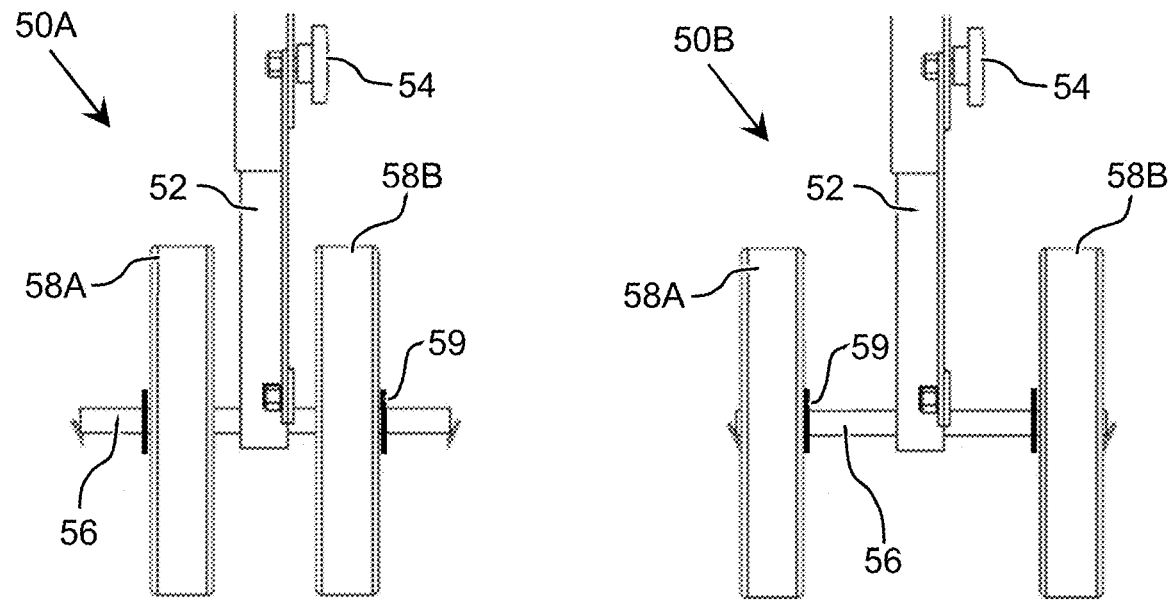

Additionally, the guide wheel structure 50 can enable adjustment of a distance between the guide wheels 58A, 58B. For example, FIG. 4A shows a narrow wheel configuration 50A and a standard wheel configuration 50B for the guide wheels 58A, 58B according to an embodiment. As illustrated, this embodiment allows placement of each guide wheel 58A, 58B in one of two or more locations along the length of the guide wheel axle 56. In the narrow wheel configuration 50A, plantings can be spaced closer together than possible using the standard wheel configuration 50B. However, the standard wheel configuration 50B may be suitable for most plantings and can provide additional stability.

The narrow and standard wheel configurations 50A, 50B can be implemented using any solution. For example, in an embodiment, for the standard wheel configuration 50B, the guide wheel axle 56 can include openings on opposing sides of the guide wheels 58A, 58B, into each of which a cotter pin 59 or the like can be inserted in order to keep the guide wheels 58A, 58B at the desired locations. For the narrow wheel configuration 50A, the openings used for the inner side of guide wheels 58A, 58B in the standard wheel configuration 50B can be used to retain the outer side of the guide wheels 58A, 58B in the narrow wheel configuration 50A. The guide wheel axle 56 can also include openings to secure the inner side of the guide wheels 58A, 58B in place in the narrow wheel configuration 50A, spaced from the guide wheel extension 52. Alternatively, each guide wheel 58A, 58B can include a structure that projects therefrom to provide a minimum spacing between the guide wheels 58A, 58B and the guide wheel extension 52.

While two spacing configurations are shown, it is understood that embodiments can enable additional spacing configurations, e.g., by the inclusion of additional openings in the guide wheel axle 56. Furthermore, it is understood that a configuration in which one of the guide wheels is closer to the guide wheel extension 52 than the other guide wheel can be utilized, e.g., to enable the transplanter 10 to be operated closer to an existing crop on the corresponding side of the closer guide wheel.

Returning to FIG. 1, the transplanter 10 includes an upper paper pot support frame 36A and a lower paper pot support frame 36B, which are mounted to the longitudinal support structure 32 (e.g., by welding or fasteners) and are configured to support a standard tray 3 holding a chain of paper pots. During use, the tray 3 of paper pots can be placed on the paper pot support frames 36A, 36B and can abut a back end of a base structure 40. The base structure 40 also is mounted to the longitudinal support structure 32 (e.g., using fasteners). In an embodiment, as shown in FIG. 2C, the longitudinal support structure 32 can include an upper longitudinal support structure 32A and a lower longitudinal support structure 32B. The upper and lower longitudinal support structures 32A, 32B can be attached to one another using any solution, e.g., welded plates and a pair of bolts. Alternatively, the longitudinal support structures 32A, 32B can be individually secured to the base structure 40.

The base structure 40 is shaped to allow a paper pot to enter the base structure 40 from any lateral location of the microgreen tray 3 mounted on the paper pot support frames 36A, 36B and travel along a chute 46 before entering the ground in a furrow formed by the furrower 38.

Figure 4B:
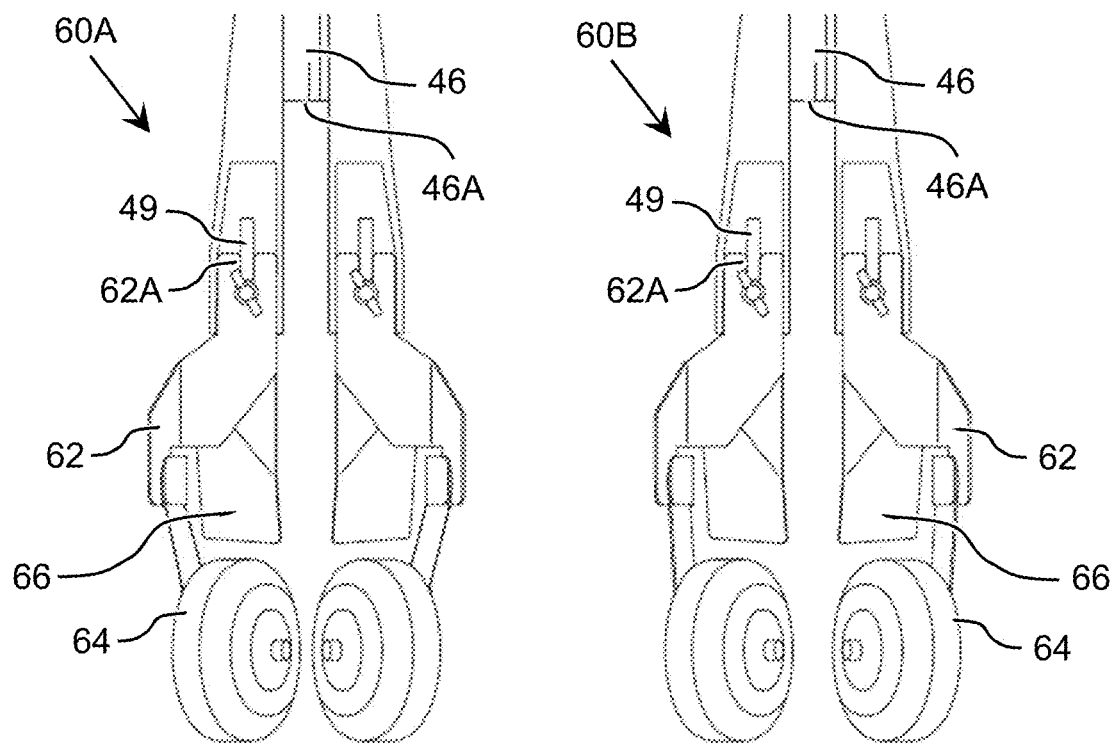
FIG. 4B shows alternative narrow and standard wheel configurations for closing wheels according to an embodiment.

As illustrated in FIG. 1, a front end of the transplanter 10 can include a furrow closing structure 60, which is configured to push soil previously pushed aside by the furrower 38 back onto the furrow with the paper pots and corresponding seedlings after they have exited the chute 46. An embodiment of the furrow closing structure 60 can be fabricated using stainless steel. However, it is understood that any suitable material can be used, such as aluminum, fiberglass, low density polyethylene (LDPE), and/or the like. An embodiment of the furrow closing structure 60 can include angled closing wheels 64 and closing plows 66. As illustrated in FIG. 4B, the furrow closing structure 60 also can include a narrow closing wheels configuration 60A and a standard closing wheels configuration 60B. The alternative configurations 60A, 60B can be implemented using any solution. For example, each configuration 60A, 60B can use a different angled wheel mount 62, which provides a different angle and/or side length, which results in the angled wheels 64 being located closer or further from each other. In an embodiment, an angled wheel mount 62 can include one or more structures that can be adjusted by an end user in order to provide a desired spacing between the closing wheels 64.

Returning to FIG. 1, in an embodiment, the base structure 40 is fabricated using injection molding. In a more particular embodiment, the base structure 40 is formed of two injection molded parts, a back portion 42 and a front portion 44. Use of injection molded parts reduces wear due to rust and can reduce movement and flexing of the base structure 40 during use, which can occur with structures fabricated with sheet metal parts as used in the prior art. Additionally, use of the injection molded parts can reduce a number of parts, an amount of material to form the base structure 40, and can result in a lighter base structure 40 than one fabricated using sheet metal. As a result, an overall weight of the transplanter 10 can be significantly reduced, making it easier for a single person to carry and use.

The inventors have found that the sheet metal used in fabricating a chute in prior art transplanters can catch the paper pots at all the connection points. As the shape of the base structure 40 is complicated, with a combination of curves and angles, there is no way to make sheet metal contiguous for this application. Fabrication of the base structure 40 using injection molded parts can provide a smooth shape with no connection points, allowing the paper pots to slide easily unobstructed.

Furthermore, the inventors have found that sheet metal parts used in prior art transplanters deform during use, transport, and at different temperatures. In contrast, the injection molded base structure 40 is much more rigid and retains the same shape. This is particularly beneficial for the chute 46, for which the shape stays consistent and does not squeeze the paper pots as they travel down the chute 46 during planting. To this extent, an interface between the bottom and side walls of the base structure 40, including the funnel-like shaped back portion 42 and the chute 46, is smooth and connected to the side walls, thereby further facilitating unobstructed pot travel across the base structure 40.

Embodiments of the injection molded base structure 40 also can provide additional benefits. For example, such benefits can include a thinner profile for the transplanter 10 since structural integrity for the base structure 40 can be achieved in a smaller space than that attainable with sheet metal. During use, a transplanter 10 may be exposed to wet conditions. Such conditions can cause the sheet metal to rust quickly. An injection molded base structure 40 does not present such an issue. Additionally, sheet metal can absorb a large amount of heat when used or stored in a sunny location. Such heat can dry out the seedlings in the paper pots, causing roots to die. In contrast, the injection molded base structure 40 will stay much cooler in such conditions.

Figure 5:
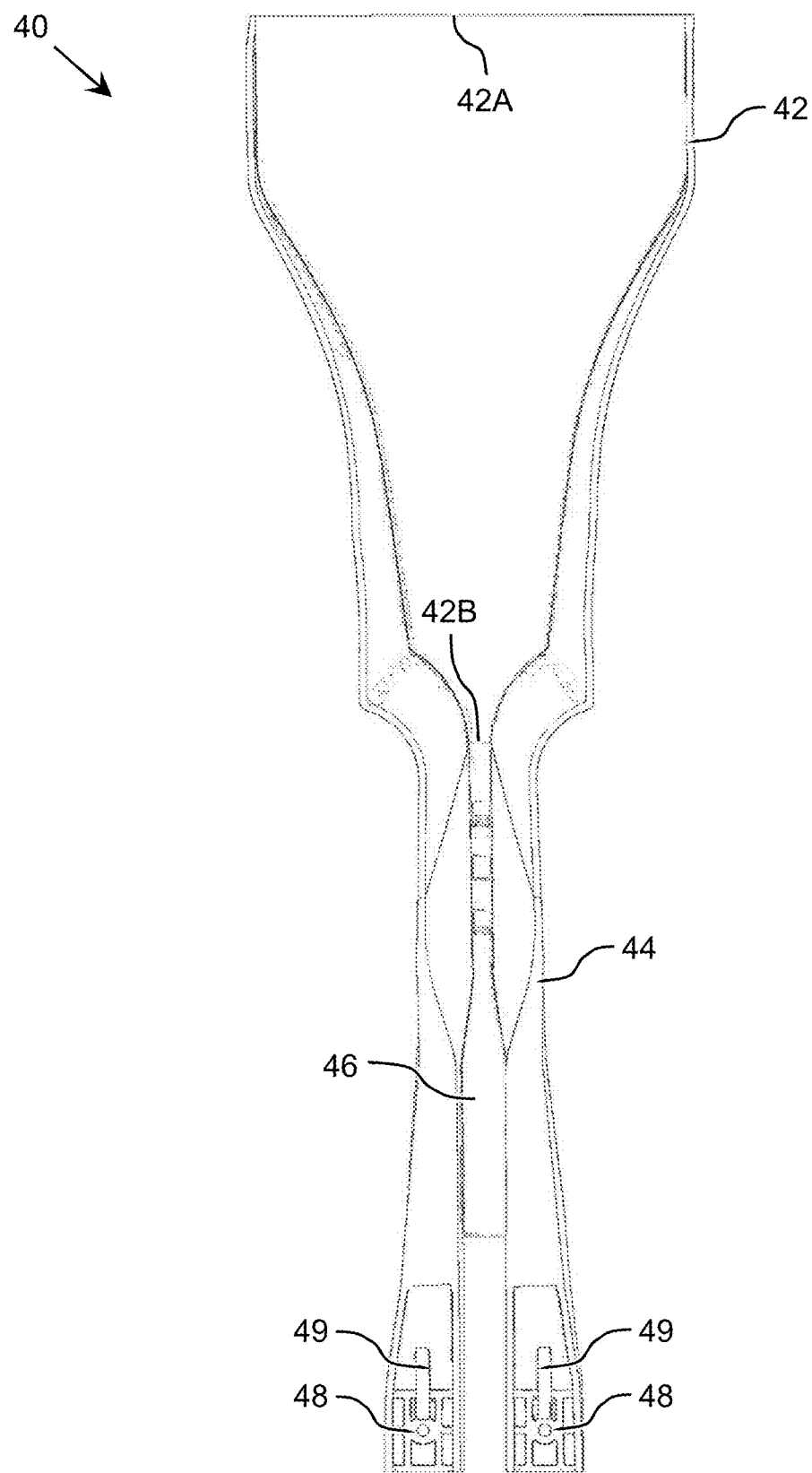
FIG. 5 shows a top plan view of an illustrative base for a transplanter according to an embodiment.
Figure 6A:
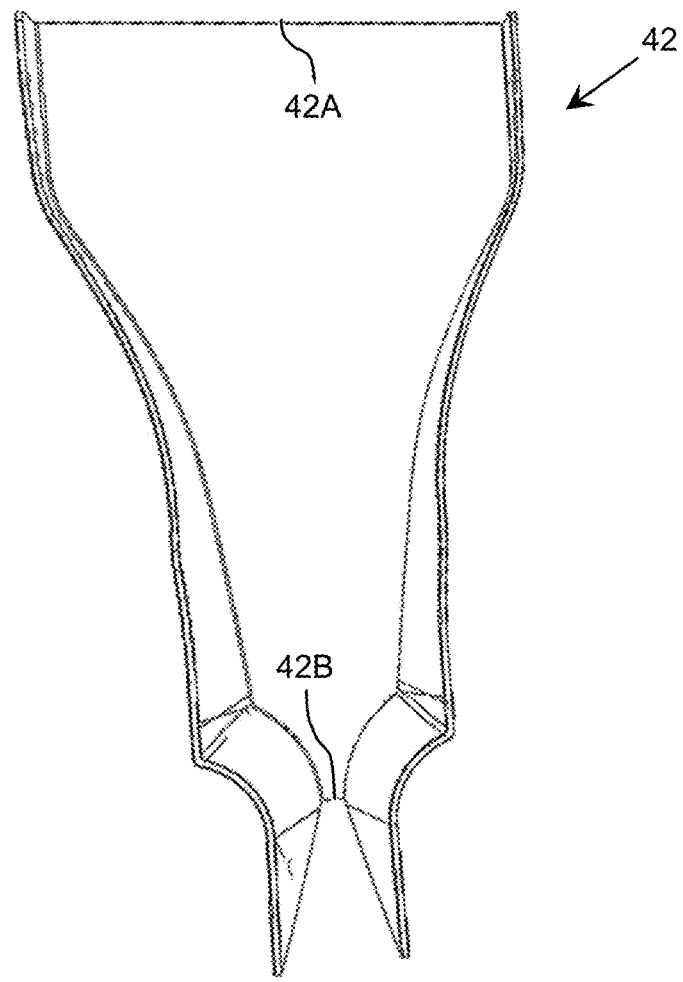
FIGS. 6A-6J show various views of an illustrative back portion of a base for a transplanter according to an embodiment.
Figure 6B:
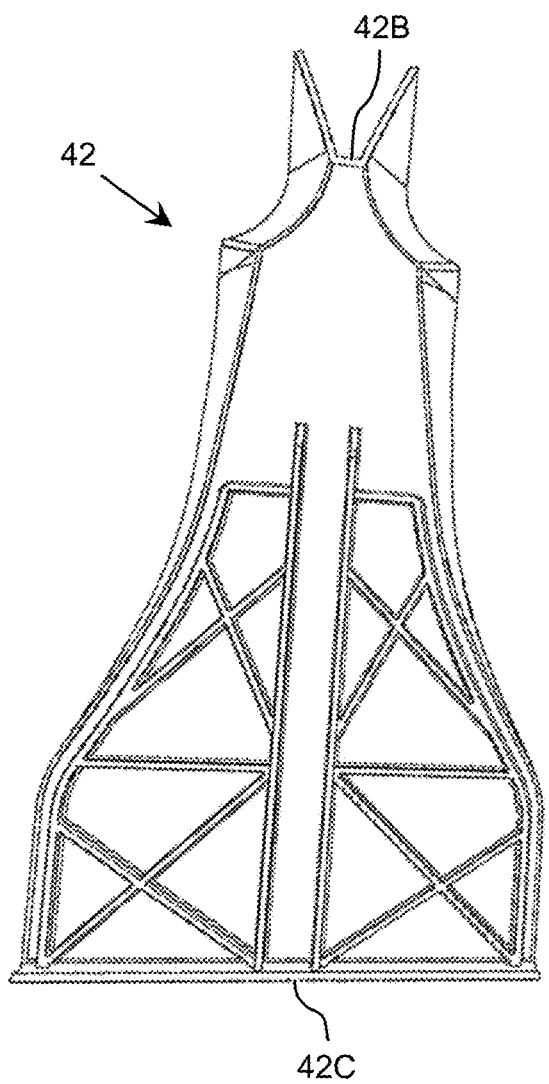
Figure 6C:
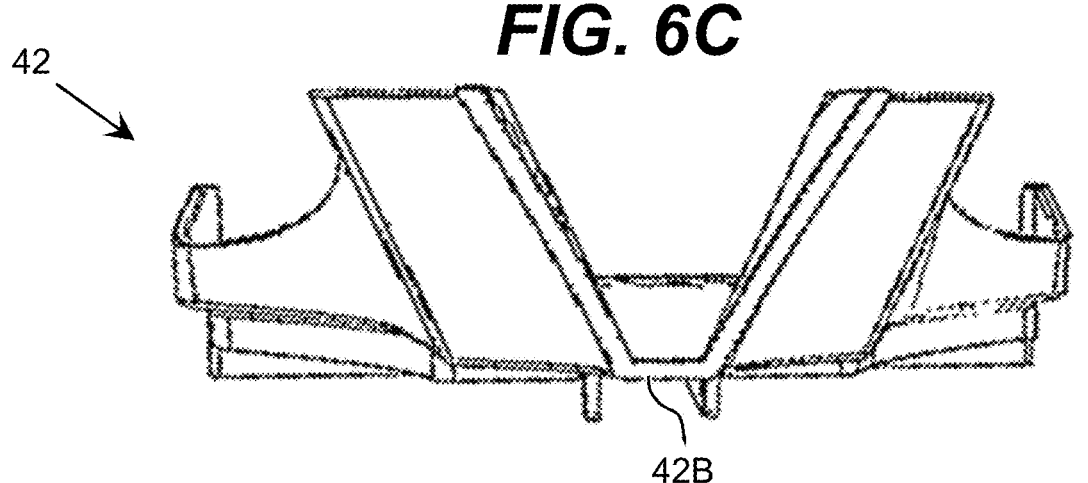
Figure 6D:
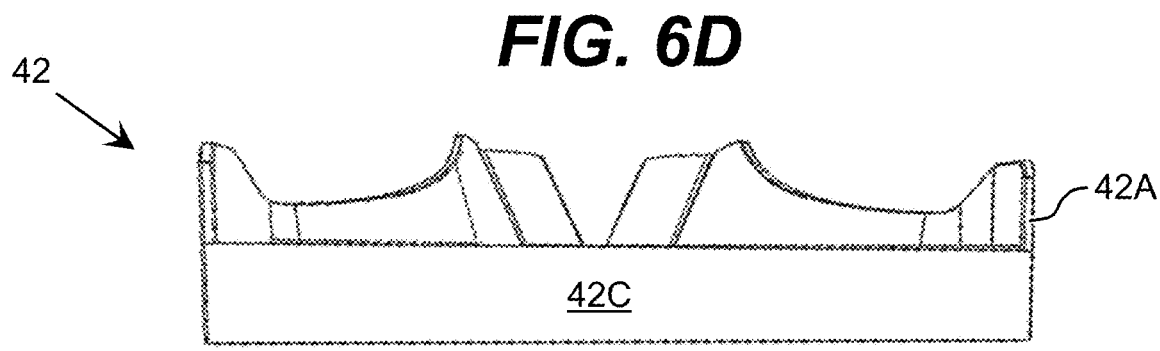
Figure 6E:
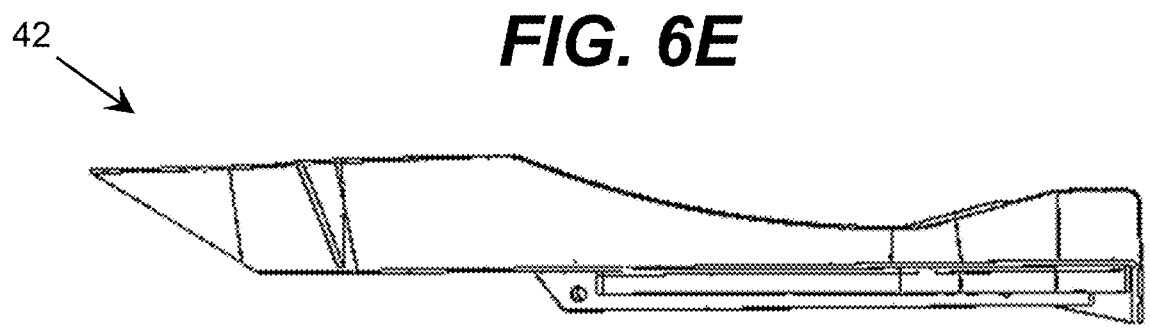
Figure 6F:
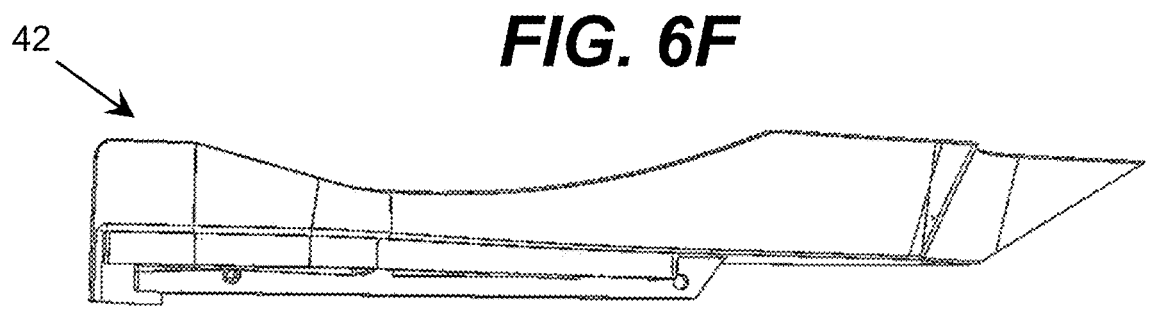
Figure 6G:
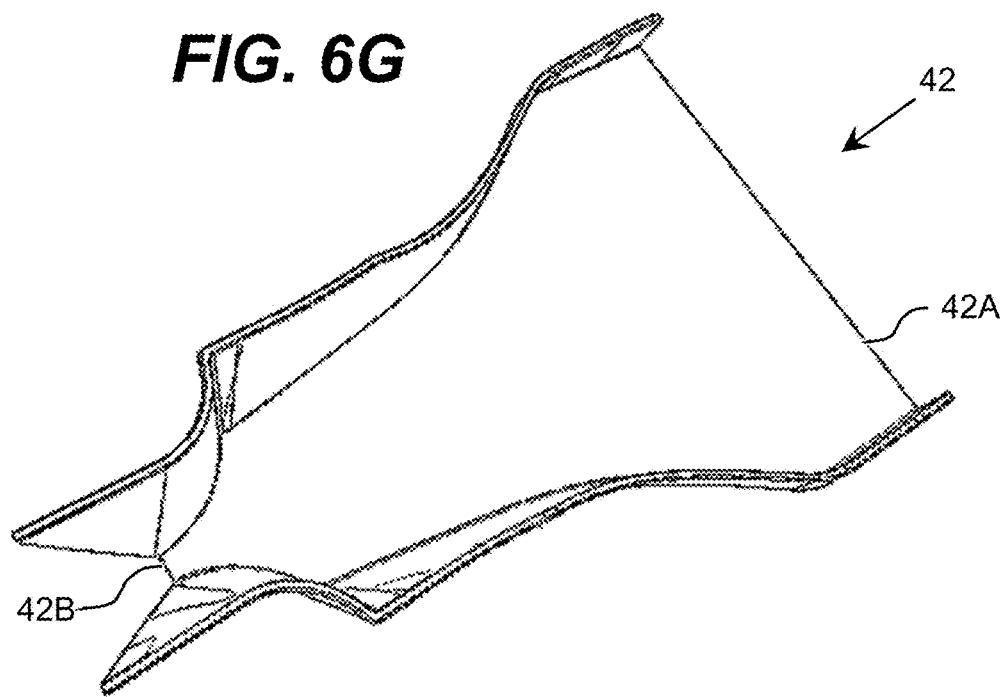
Figure 6H:
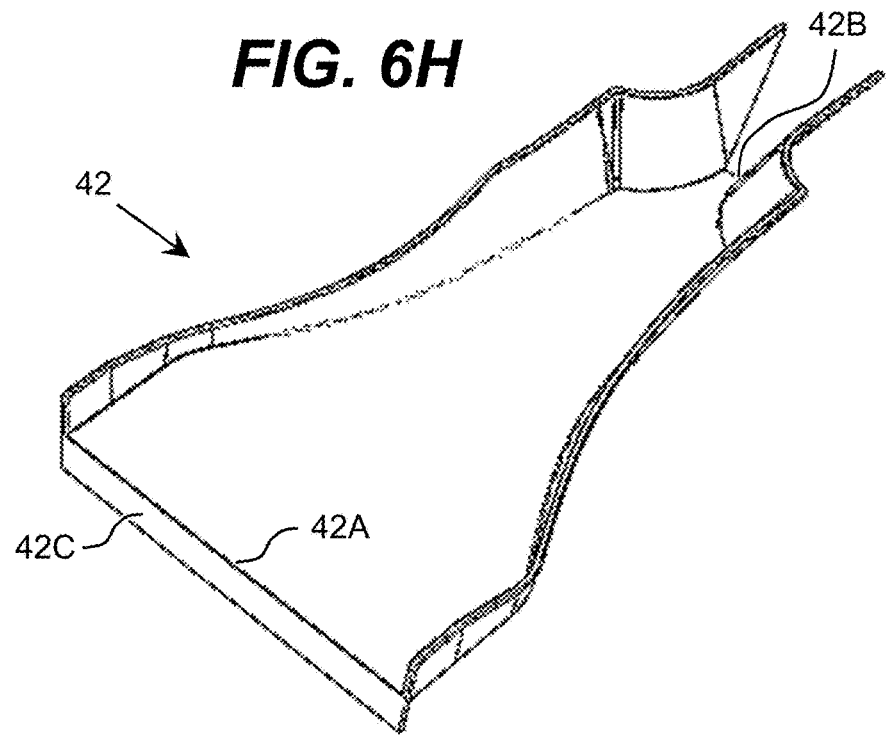
Figure 6I:
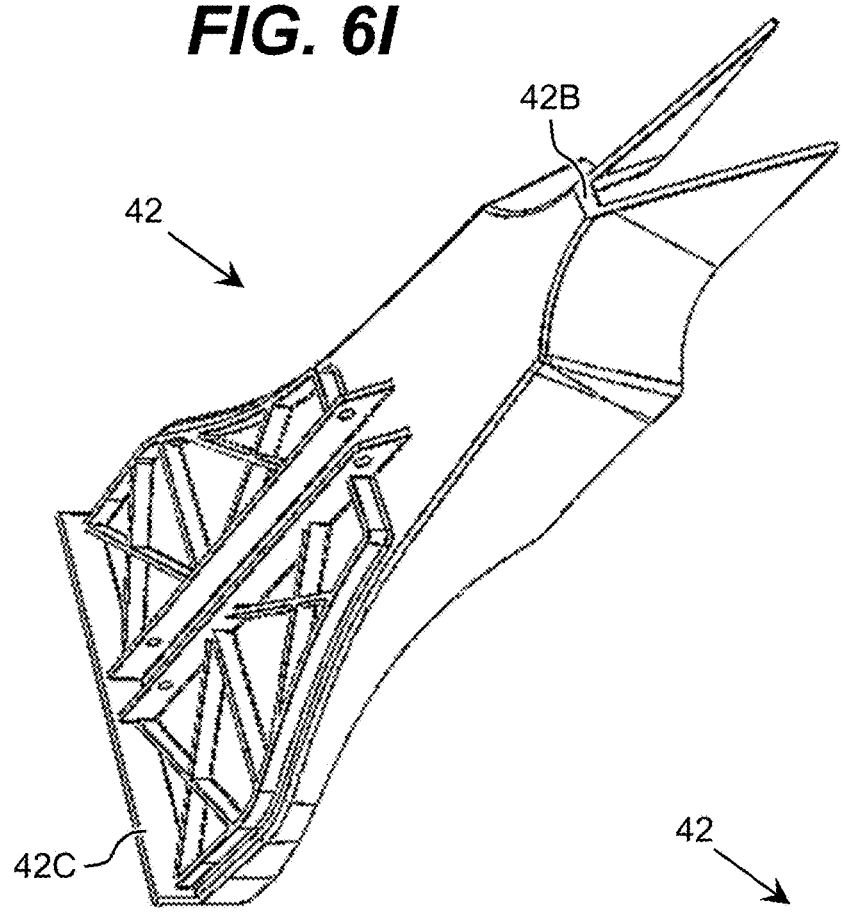
Figure 6J:
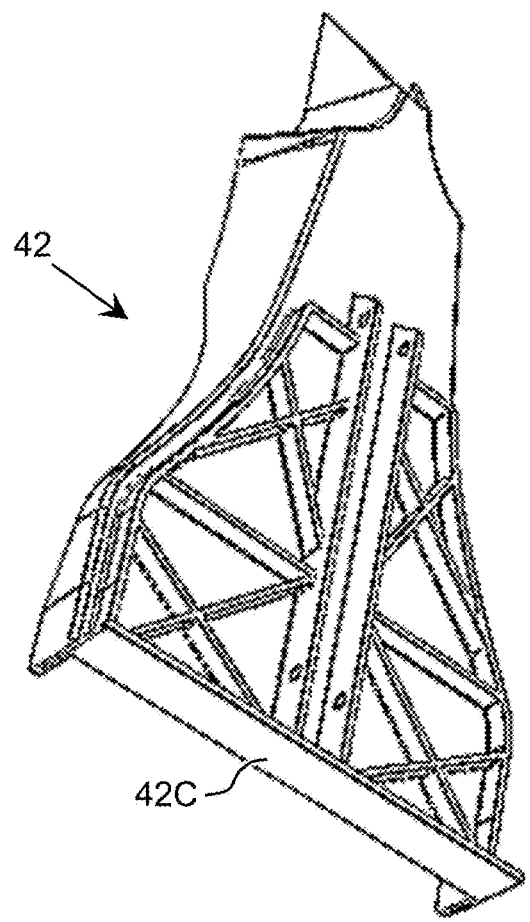

FIG. 5 shows a top plan view of an illustrative base 40 for a transplanter 10 according to an embodiment. FIGS. 6A-6J show top, bottom, front, back, left side, right side, and various perspective views, respectively, of an illustrative back portion 42 of a base for a transplanter 10 according to an embodiment. FIGS. 7A-7J show top, bottom, front, back, left side, right side, and various perspective views, respectively, of an illustrative front portion 44 of a base for a transplanter 10 according to an embodiment.

As illustrated in FIGS. 5-7J, the back portion 42 of the base 40 can have a funnel-like shape, which includes a wide entrance end 42A, and a narrower exit end 42B. The back portion 42 can provide a transition area between the respective ends 42A, 42B, which has a smooth shape, which decreases in lateral size with distance from the wide entrance end 42A. The entrance end 42A can have a width that corresponds approximately to a width of a tray 3 to be abutted thereto. In an embodiment, the width of the entrance end 42A can be slightly smaller than the width of the tray 3, which can assist in holding the tray 3 in place and with a desired orientation. Additionally, as illustrated in FIG. 6D, the entrance end 42A can include a set of vertical structures 42C, which can be configured to abut against the tray 3. For example, the set of vertical structures 42C can comprise a vertical wall. Each of the set of vertical structures 42C can have a height that is the same as or lower than a height of the tray 3, so as to not impede the traversal of the paper pots therefrom.

The back portion 42 of the base 40 and the front portion 44 of the base 40 can interface at a start of a chute 46. For example, each portion 42, 44 can have an angled end, which are complementary to each other and abut when mounted to the frame structure 30. However, it is understood that this is only illustrative. Embodiments of the base 40 can be fabricated using a single injection molded part, or two or more injection molded parts, which can interface at any desired locations of the base 40. In an embodiment, each injection molded part is fabricated using a polymer which provides a rigid material that will not easily break.

Figure 7A:
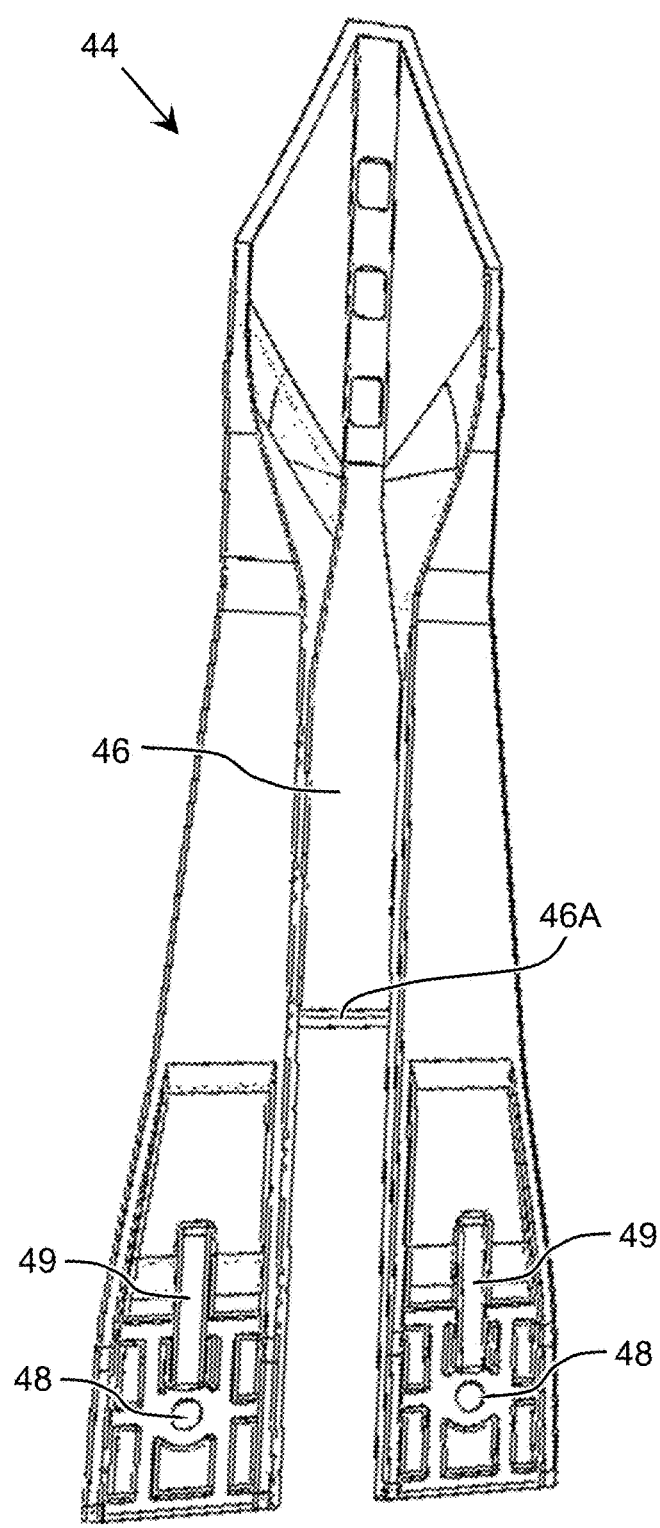
FIGS. 7A-7J show various views of an illustrative front portion of a base for a transplanter according to an embodiment.
Figure 7B:
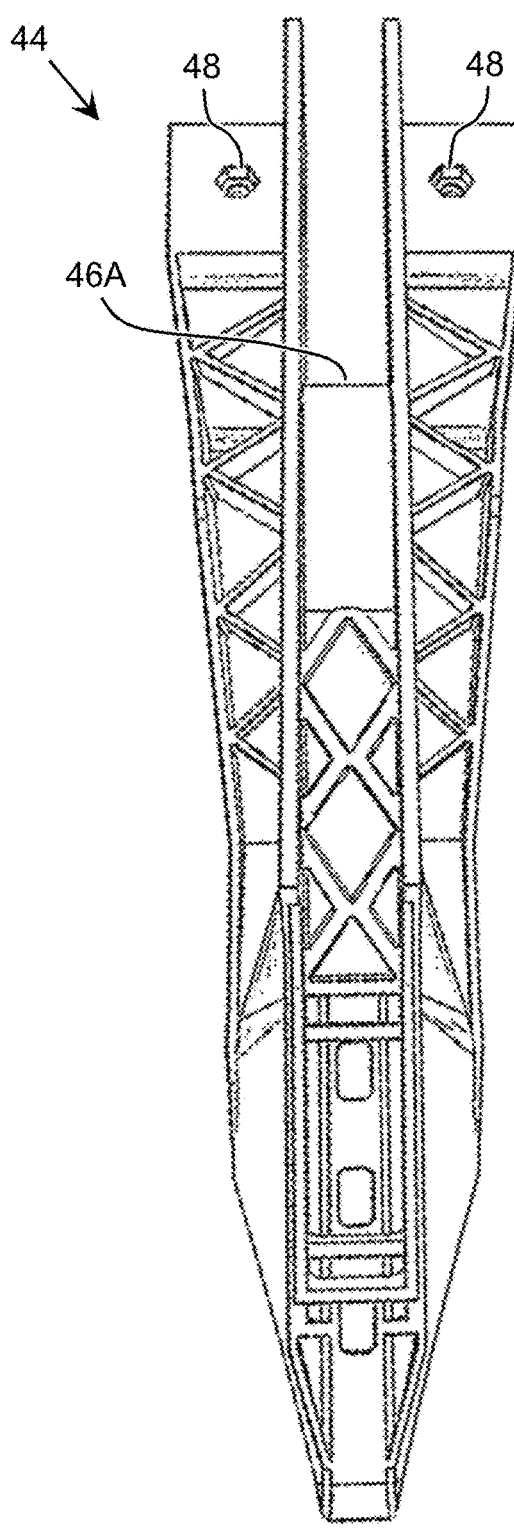
Figure 7C:
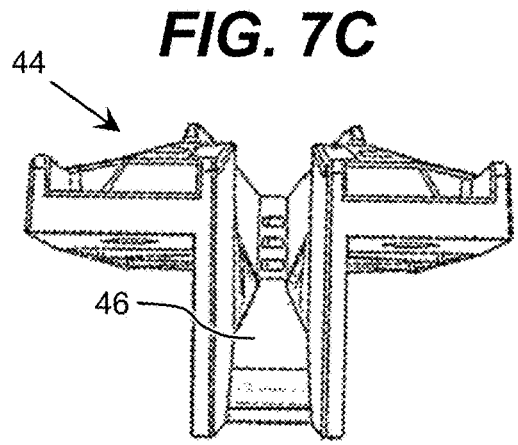
Figure 7D:
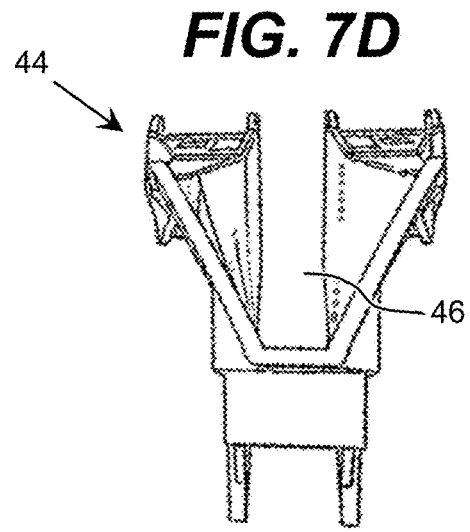
Figure 7E:
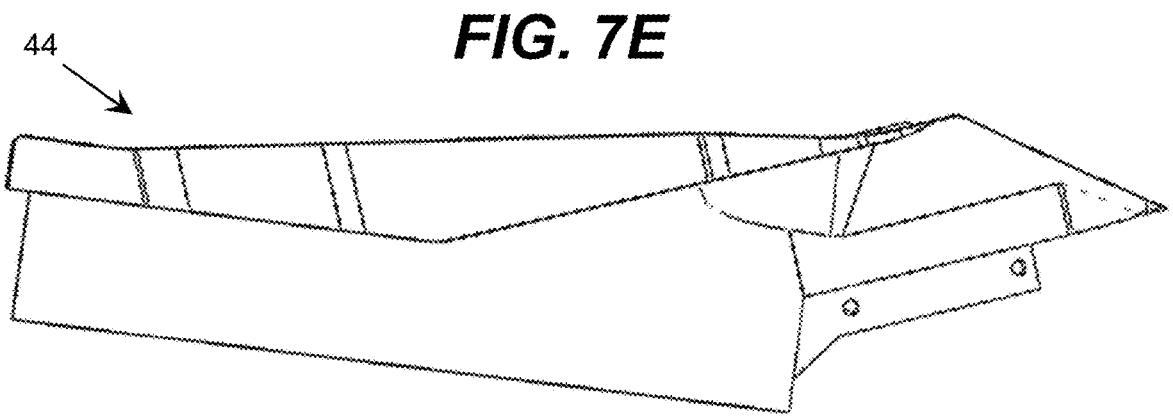
Figure 7F:
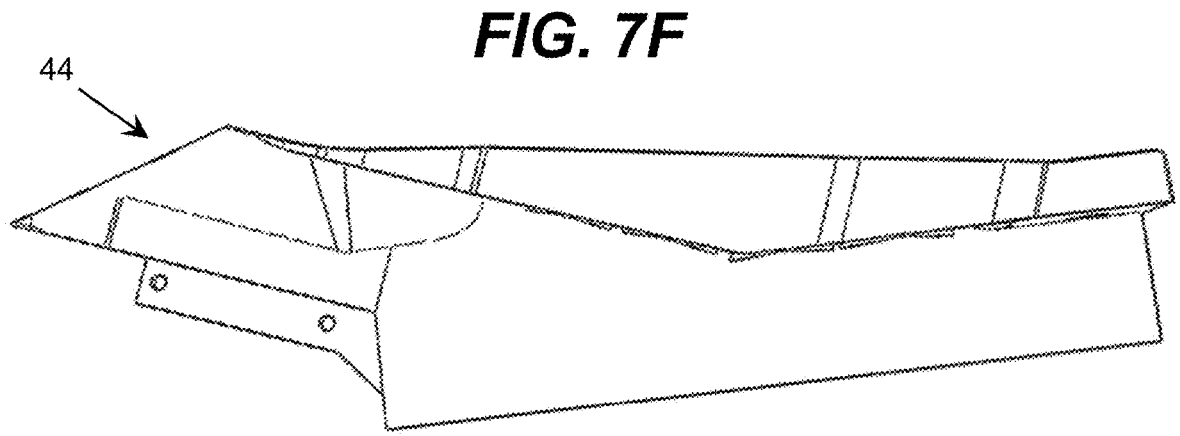
Figure 7G:
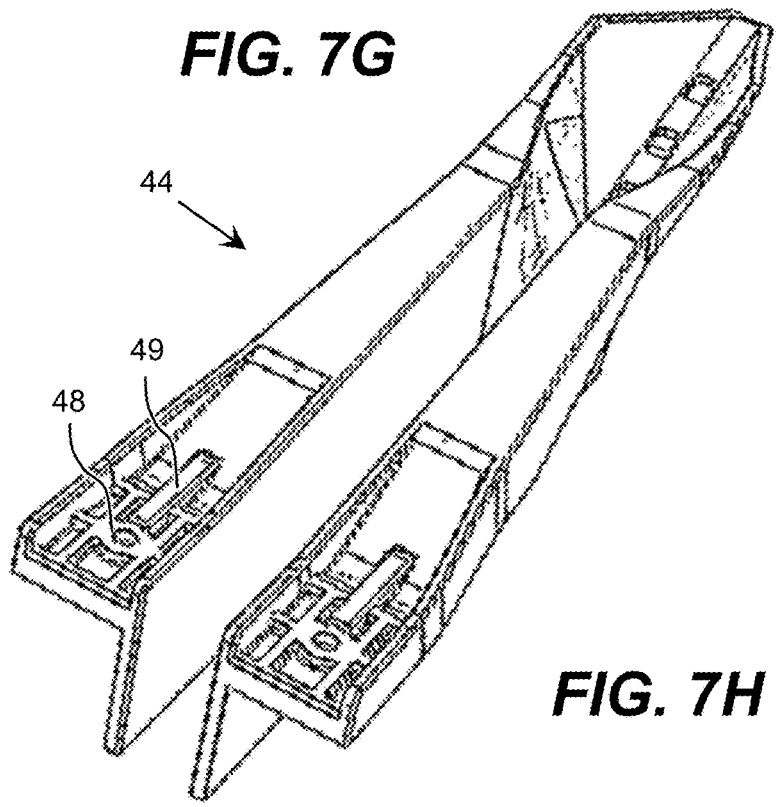
Figure 7H:
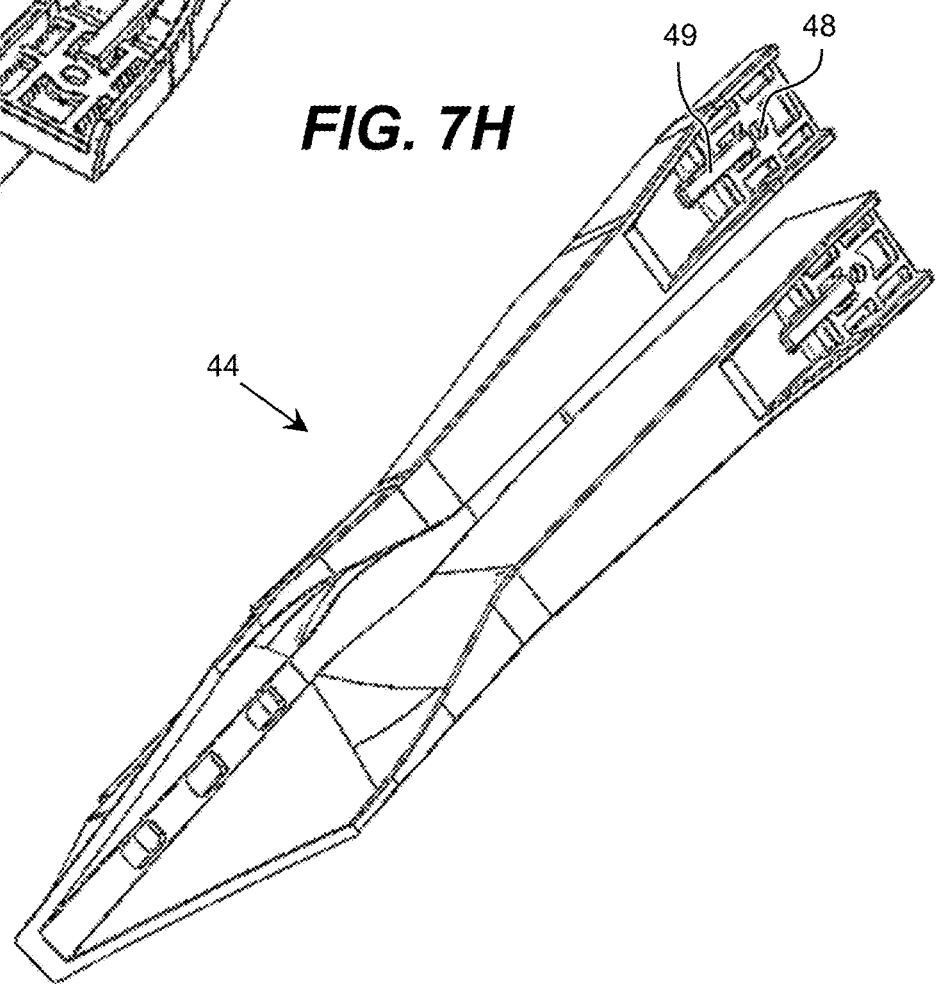
Figure 7I:
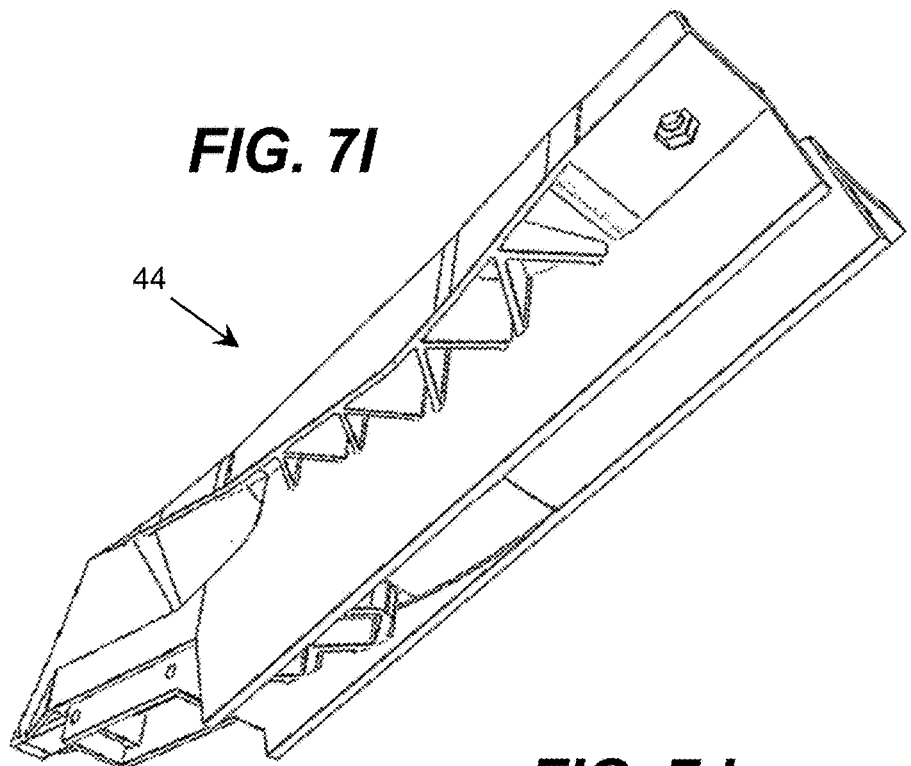
Figure 7J:
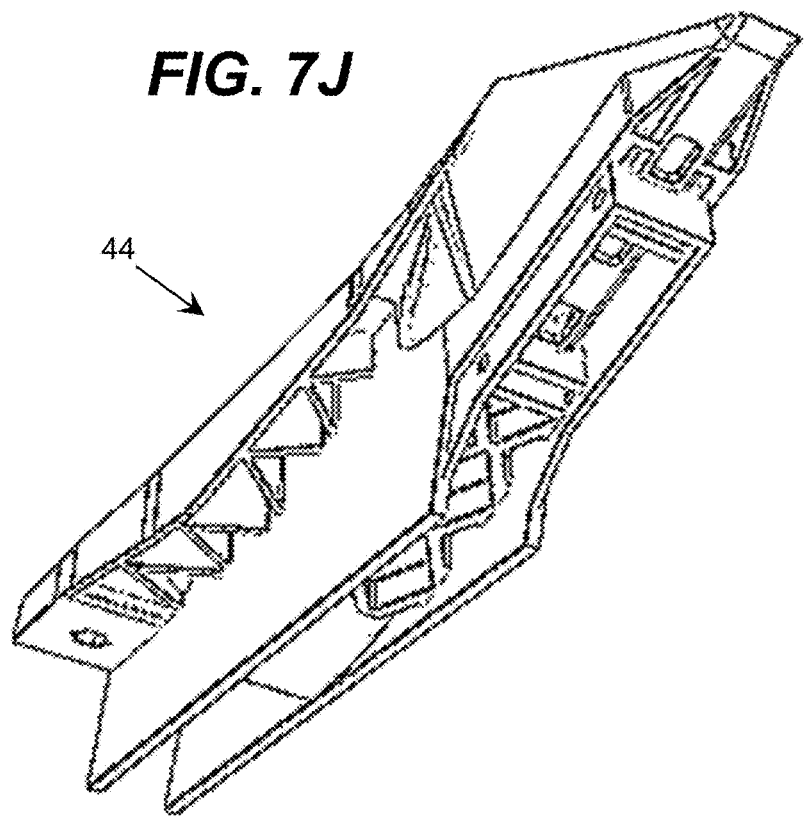

As illustrated in the drawings, each portion 42, 44 can include lattice-like structures on a bottom side to provide additional support to the corresponding part, without adding a significant amount of weight to the part. Additionally, the closing wheel mounts 48 on the front portion 44 of the base 40 can include structures that provide additional support and/or assist in properly aligning the furrow closing structure 60 when it is mounted thereto. For example, as shown in FIGS. 4B and 7A, the front portion 44 of the base 40 can include structures that extend beyond each side of an end 46A of the chute 46. Each structure can include a projection 49, which is sized to accommodate a slot 62A included on an end of the angled wheel mount 62. When the slot 62A is properly located around the projection 49, an opening in the angled wheel mount 62 can be aligned with the closing wheel mount 48 to enable the angled wheel mount 62 to be secured to the front portion 44 of the base 40, e.g., using a wing bolt or the like. The projection 49 and the slot 62A can cause the corresponding closing plow 55 and closing wheel 64 to be properly aligned with the chute 46 and the furrow formed by the furrower 38. The alignment can provide a preconfigured or a reconfigurable spacing between the closing structures located on opposing sides of the chute 46.

Figure 8A:
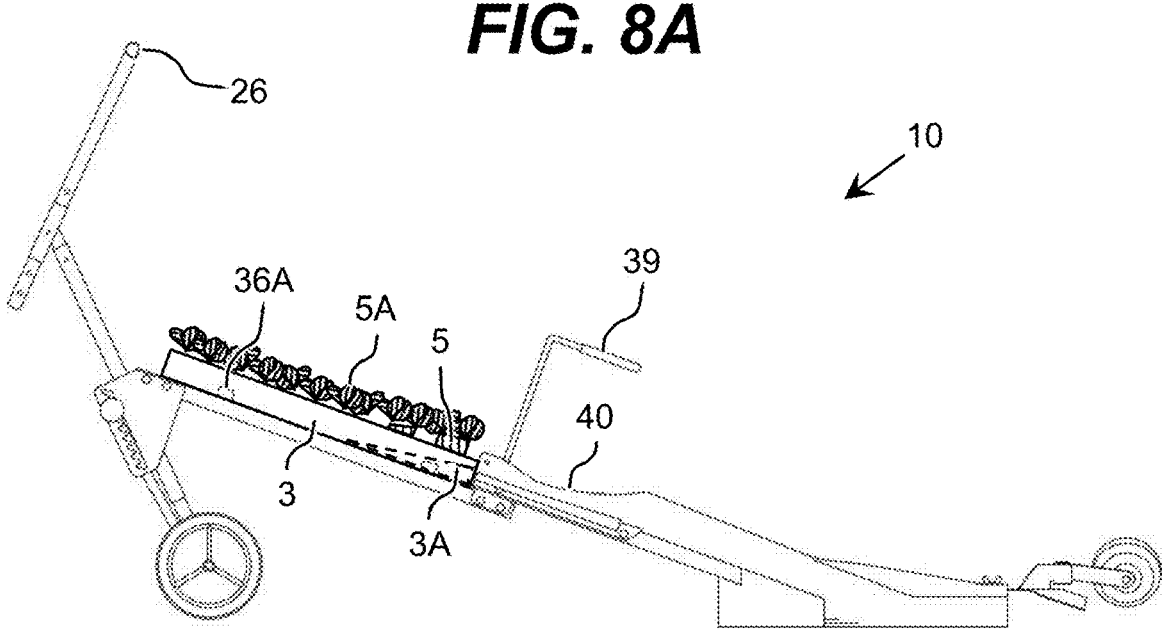
FIGS. 8A-8D show various views illustrating use of an illustrative transplanter according to an embodiment.
Figure 8B:
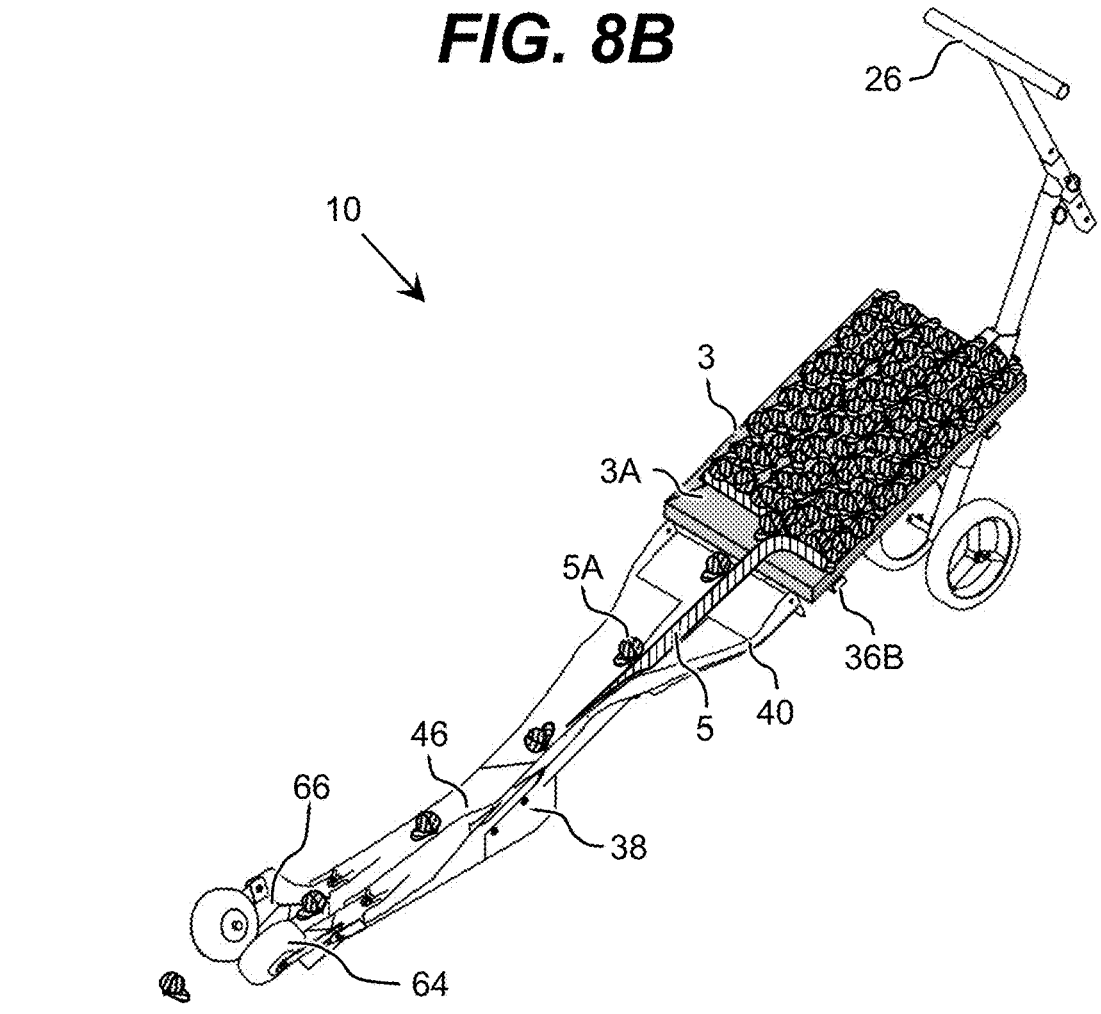
Figure 8C:
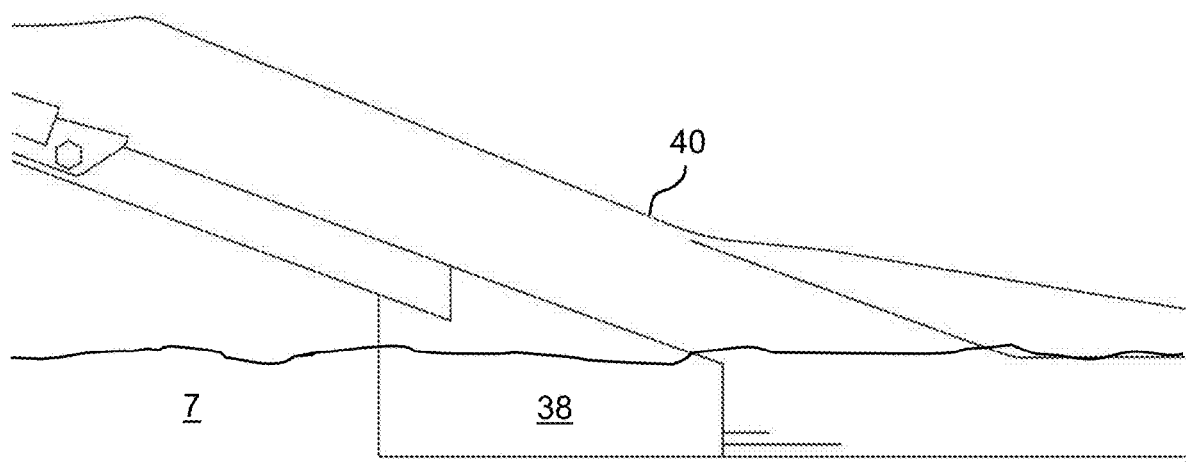
Figure 8D:
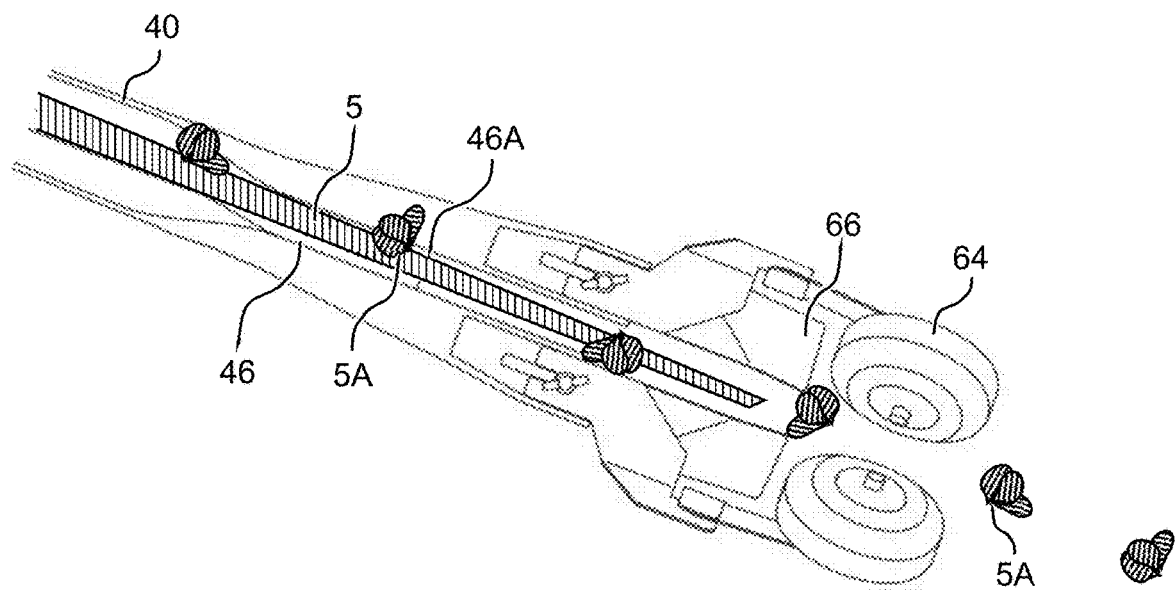

FIGS. 8A-8D show various views illustrating use of an illustrative transplanter according to an embodiment. As shown in FIGS. 8A and 8B, a paper pot tray 3 can be placed on the paper pot support frames 36A, 36B and can abut a back end of the base structure 40. A weight of the transplanter 10 can be generally balanced on opposing sides of the transport handle 39 (not shown in FIG. 8B for clarity) such that a user can carry the transplanter 10 by the transport handle 39 alone, and the base structure 40 of the transplanter 10 can stay generally horizontally oriented. The user can use the transport handle 39 and the grip 26 to place the transplanter 10 in a desired location to begin use.

The paper pot tray 3 includes a paper pot chain 5 which includes a plurality of serially connected paper pots 5A. In general, most or all of the paper pots 5A can include a transplant of a plant for planting in a field. Each transplant can be of the same type of plant or can include multiple different plants. The paper pots 5A can be spaced along the paper pot chain 5 having a predetermined spacing of any desired amount, which can vary based on the type of plants being planted.

In the embodiment shown, a ramp 3A is placed under the paper pots 5A in the front of the paper pot tray 3, which lifts the paper pots 5 above the paper pot tray 3 and allows the paper pots 5A to readily traverse down the base 40 before exiting the chute 46. In general, a user can hold the grip 26 and pull the transplanter 10 along a row in a field. As illustrated in more detail in FIGS. 8C and 8D, the pulling motion causes the furrower 38 to create a furrow in the soil 7, causes the chain of paper pots 5 to traverse the base structure 40 and drop into the furrow at the end 46A of the chute 46, and causes the angled wheels 64 and closing plows 66 to replace the soil back onto the furrow and the paper pots 5A located therein. The angled wheels 64 and closing plows 66 can have a size, location, and an angle, that are suitable for replacing the soil back onto the furrow without damaging the transplants now located therein. To start a row, the initial paper pots 5A in the paper pot chain 5 can be fed through the base structure 40 and the paper pot chain 5 and/or a paper pot 5A can be buried in the soil, thereby pulling the remaining paper pots 5A in the paper pot chain 5 along the base structure 40 as the transplanter 10 is moved.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A transplanter comprising:
    a guide wheel structure including a set of guide wheels, wherein the set of guide wheels includes two guide wheels configured to be selectively configured with any one of at least two preconfigured spacings there between;
    a frame structure including a longitudinal support structure and a set of frames configured for supporting a tray including a chain of paper pots including a plurality of seedlings;
    an operating handle structure connected to the guide wheel structure and a first end of the longitudinal support structure, the operating handle structure including a grip for pulling the transplanter; and
    a base structure connected to the longitudinal support structure and extending beyond a second end of the longitudinal support structure, the base structure including a back end, a funnel-like shaped back portion, and a chute, wherein the base structure is configured to support the tray against the back end and guide the chain of paper pots from the tray along the funnel-like shaped back portion to the chute and off the transplanter as the transplanter is pulled by a user to plant a single row of the seedlings in a field.

2. The transplanter of claim 1, wherein the base structure includes at least two injection molded parts, including:
    a back portion, wherein the back portion comprises the funnel-like shape; and
    a front portion, wherein the front portion comprises the chute.

3. The transplanter of claim 1, wherein the frame structure further includes a furrower configured to form a furrow in soil, and wherein the transplanter further includes a furrow closing structure configured for closing the furrow, wherein the furrow closing structure is mounted to the base structure at a location beyond an end of the chute.

4. The transplanter of claim 3, wherein the furrow closing structure includes a pair of angled closing plows located on opposing sides of the chute.

5. The transplanter of claim 3, wherein the furrow closing structure includes a pair of angled closing wheels located on opposing sides of the chute.

6. The transplanter of claim 1, wherein the operating handle structure further includes:
    a fixed extension attached to the frame structure; and
    an adjustable extension configured to be attached to the fixed extension, wherein the grip is attached to the adjustable extension, and wherein at least one of: an angle between the fixed extension and the adjustable extension or a length of the adjustable extension extending from an end of the fixed extension, is selectively adjustable.

7. The transplanter of claim 6, wherein the operating handle structure further includes a connector piece for enabling attachment of the adjustable extension to the fixed extension in one of a plurality of selectable angles between the fixed extension and the adjustable extension.

8. The transplanter of claim 7, wherein at least one of the plurality of selectable angles enables the adjustable extension and the grip to support the transplanter in an upright orientation on a level surface.

9. The transplanter of claim 1, wherein the base structure is fabricated from at least one injection molded part.

10. The transplanter of claim 1, further comprising a furrow closing structure configured for closing a furrow for the single row of the seedlings as the transplanter is pulled by the user, wherein the furrow closing structure includes a pair of angled closing wheels located beyond an end of the chute, and wherein the transplanter enables selection of at least two preconfigured spacings between the angled closing wheels.

11. A transplanter comprising:
    a guide wheel structure including a set of guide wheels;
    a frame structure including:
        a set of frames configured for supporting a tray; and
        a furrower configured to form a furrow in soil;
    an operating handle structure connected to the guide wheel structure and the frame structure, wherein the operating handle structure includes:
        a fixed extension attached to the frame structure and the guide wheel structure;
        an adjustable extension configured to be attached to the fixed extension, wherein an angle between the fixed extension and the adjustable extension is selectively adjustable; and
        a grip for operating the transplanter, wherein the grip is attached to an end of the adjustable extension;
    a base structure including a funnel-like shaped back portion and a chute extending from the funnel-like shaped back portion; and
    a furrow closing structure configured for closing the furrow, wherein the furrow closing structure is mounted to the base structure at a location beyond an end of the chute.

12. The transplanter of claim 11, wherein a length of the adjustable extension extending from an end of the fixed extension is selectively adjustable.

13. The transplanter of claim 11, wherein the base structure is fabricated from at least one injection molded part.

14. The transplanter of claim 11, wherein the furrow closing structure includes a pair of angled closing plows located on opposing sides of the chute.

15. The transplanter of claim 11, wherein the furrow closing structure includes a pair of angled closing wheels located on opposing sides of the chute.

16. The transplanter of claim 11, wherein the operating handle structure further includes a connector piece for enabling attachment of the adjustable extension to the fixed extension in one of the plurality of selectable angles between the fixed extension and the adjustable extension.

17. The transplanter of claim 16, wherein at least one of the plurality of selectable angles enables the adjustable extension and the grip to support the transplanter in an upright orientation on a level surface.

18. The transplanter of claim 11, wherein the set of guide wheels includes two guide wheels configured to be selectively installed with one of a plurality of different spacings there between.

19. A transplanter comprising:
a guide wheel structure including a set of guide wheels;
a frame structure including:
  a set of frames configured for supporting a tray; and
  a furrower configured to form a furrow in soil;
an operating handle structure connected to the guide wheel structure and the frame structure, wherein the operating handle structure includes:
  a fixed extension attached to the frame structure and the guide wheel structure;
  an adjustable extension configured to be attached to the fixed extension, wherein an angle between the fixed extension and the adjustable extension is selectively adjustable; and
  a grip for operating the transplanter, wherein the grip is attached to an end of the adjustable extension;
a base structure including a chute, wherein the base structure is fabricated from at least one injection molded part; and
a furrow closing structure configured for closing the furrow, wherein the furrow closing structure is mounted to the base structure at a location beyond an end of the chute.

20. The transplanter of claim 19, wherein the furrow closing structure includes:
a pair of angled closing plows located on opposing sides of the chute; and
a pair of angled closing wheels located on opposing sides of the chute.

21. The transplanter of claim 19, further comprising a transport handle attached to the frame structure.

* * * * *